United States Patent [19]

Smith et al.

[11] Patent Number: 5,128,071
[45] Date of Patent: Jul. 7, 1992

[54] CARBURETOR

[75] Inventors: George B. Smith, Richland Center; Timothy T. Tiller, Blue River, both of Wis.

[73] Assignee: S & S Cycle, Inc., Richland Center, Wis.

[21] Appl. No.: 651,474

[22] Filed: Feb. 6, 1991

[51] Int. Cl.$^5$ .............................................. F02M 7/08
[52] U.S. Cl. .................. 261/34.2; 261/39.5; 261/41.5; 261/DIG. 8; 55/510
[58] Field of Search ............... 261/34.2, DIG. 8, 39.5, 261/41.5; 55/510

[56] References Cited

U.S. PATENT DOCUMENTS

| | | | |
|---|---|---|---|
| 2,267,570 | 12/1941 | Markham | 261/41.5 |
| 2,387,303 | 10/1945 | Sebok | 55/510 |
| 2,868,185 | 1/1959 | Bellicardi | 55/39.5 |
| 2,939,775 | 6/1960 | Middleton et al. | 55/510 |
| 3,031,026 | 4/1962 | Price | 55/510 |
| 3,281,128 | 10/1966 | Phillips | 55/34.2 |
| 3,307,836 | 3/1967 | Arndt et al. | 261/DIG. 8 |
| 3,576,315 | 4/1971 | Sutton | 261/39.5 |
| 3,589,108 | 6/1971 | Dingel et al. | 55/510 |
| 3,689,036 | 9/1972 | Kikuchi et al. | 261/34.2 |
| 3,780,996 | 12/1973 | Nutten | 55/DIG. 8 |
| 3,917,760 | 11/1975 | Swatman | 261/DIG. 8 |
| 4,052,489 | 10/1977 | Frey | 261/41.5 |
| 4,089,914 | 5/1978 | Yoshioka et al. | 261/34.2 |
| 4,203,405 | 5/1980 | Schulz et al. | 261/DIG. 8 |
| 4,229,384 | 10/1980 | Karino et al. | 261/39.5 |
| 4,247,491 | 1/1981 | Tamaki et al. | 261/34.2 |
| 4,251,471 | 2/1981 | Schwander et al. | 261/34.2 |
| 4,264,536 | 4/1981 | Yoshioka et al. | 261/39.5 |
| 4,285,887 | 8/1981 | Akiya | 261/34.2 |
| 4,426,962 | 1/1984 | Otani et al. | 261/39.5 |
| 4,838,909 | 6/1989 | Bidanset | 55/DIG. 28 |

FOREIGN PATENT DOCUMENTS 214216  3/1961  Austria ................................. 55/510

Primary Examiner—Tim Miles
Attorney, Agent, or Firm—Foley & Lardner

[57] ABSTRACT

A butterfly type motorcycle carburetor including a housing having an induction passage and a venturi intermediate the ends of the passage, a butterfly valve assembly positioned in the induction passage downstream from the venturi and a fuel bowl mounted on the housing and forming a fuel reservoir below the induction passage. A main discharge tube is mounted in the housing with one end extending into the venturi in the induction passage and the other end into the fuel reservoir in the fuel bowl. An accelerator pump system is provided in the carburetor which includes a discharge nozzle that extends into the induction passage downstream from the venturi for directing fuel discharged from the nozzle toward the butterfly valve. An enrichment system is provided in the carburetor which can be selectively set at any position. A low speed air/fuel metering system is provided in the housing for low speed operation. A teardrop type air cleaner is mounted on the inlet end of the induction passage and includes an air directional cone axially aligned with the induction passage for directing filtered air into the induction passage. All of the air passing through the carburetor is filtered before entering the carburetor.

18 Claims, 8 Drawing Sheets

CARBURETOR

FIELD OF THE INVENTION

The present invention relates to butterfly type carburetors for motorcycle application and more particularly to an improved carburetor having an adjustable volume accelerator pump, a full range enrichment system and a teardrop shaped air cleaner having an eccentrically located cone.

BACKGROUND OF THE INVENTION

Cold starting enrichment systems of various types are well known. Typical examples of these systems are shown in U.S. Pat. No. 3,414,243, issued on Dec. 3, 1968, entitled "Carburetor Having A Cold Starting And Enrichment Mechanism," U.S. Pat. No. 3,789,702, issued on Feb. 5, 1974, entitled "Vacuum Control For Carburetor Power Enrichment Apparatus," U.S. Pat. No. 3,886,241, issued May 27, 1975, entitled "Carburetor Cold Enrichment Control," and U.S. Pat. No. 3,962,379, issued June 8, 1976, entitled "Carburetor Cold Enrichment System Having Automatic Choke Opener And Fast Idle Cam High Step Pulloff Apparatus." The '243 patent to Baczkowski, et al. describes an enrichment bypass system for the throttle plate which is responsive to engine manifold vacuum to control the bypass passage which is automatically closed by a thermally responsive element when the engine reaches operating temperature. The patents '702 to Price and '241 to Schubeck and '379 to Freismuth, et al. are all systems which are responsive to temperature and vacuum conditions on engine start-up which are closed when the engine reaches normal operating temperatures and pressures.

Hand operated enrichment devices are also well known wherein the operator manually opens a bypass line to momentarily enrich the fuel level on start-up of the engine and immediately closes the bypass port when the engine starts operating.

SUMMARY OF THE PRESENT INVENTION

The present invention provides a butterfly type carburetor with fully adjustable idle mixture screw and changeable low speed and high speed jets. The idle mixture screw has been advantageously repositioned and angled for greater accessibility in adjusting ease by the operator.

An adjustable volume accelerator pump provides instant throttle response at any r.p.m. level. An accelerator pump ejector nozzle is located in line with and between the main discharge tube and the throttle butterfly plate and does not interfere with or detract from air flow through the carburetor throat. The fuel outlet orifice in the nozzle is angled toward the throttle butterfly pivot axis to achieve optimum fuel atomization before the charge reaches the manifold intake runner, thus eliminating off idle and low r.p.m. hesitation.

A particularly significant improvement has been achieved by a redesigned teardrop shaped air cleaner assembly which has an eccentrically located air directional cone which is axially aligned with an air horn style radius entry which increases overall air flow characteristics.

The overall carburetor length has been reduced 1-7/16 inches compared to our previous high performance carburetors. The redesigned teardrop air cleaner features a backplate which recesses around the carburetor to provide more air cleaner element depth. This increases air flow without protruding further outward, thereby providing more leg room for the rider than formerly available.

The enrichment/fast idle device is advantageously located next to the air cleaner in a convenient location where a variable position lever attached to the air cleaner backplate can be accessed to regulate the air and fuel mixture. A simple adjustment of the lever to the most advantageous position enhances starting and warm ups regardless of other engine performance changes and/or atmospheric conditions.

Another feature of the invention is locating the metering passage for air to be initially mixed with fuel for the high speed system in the interior carburetor body chamber, rather than an exterior location. Because this interior chamber is connected to outside air through the air cleaner backplate, air requirements are filtered before entering the carburetor.

Other principal features and advantages of the invention will become apparent to those skilled in the art upon review of the following drawings, the detailed description and the appended claims.

DETAILED DESCRIPTION OF THE DRAWINGS

Figure 1:
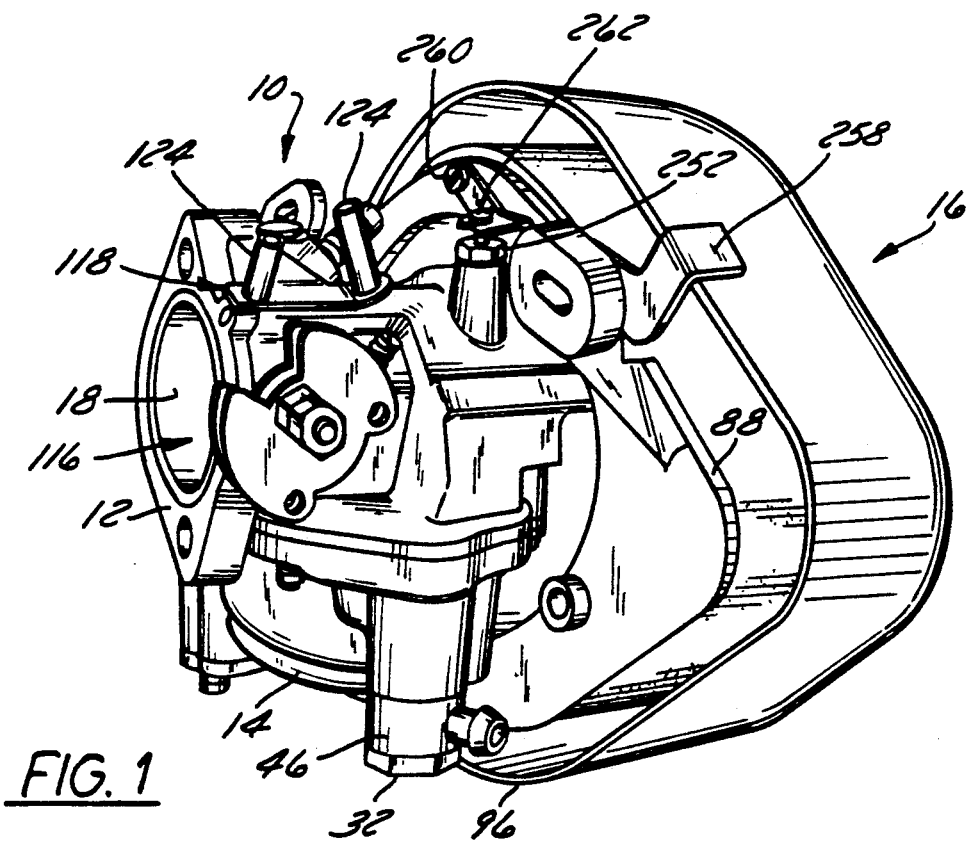
FIG. 1 is a perspective view of the carburetor according to the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Figure 2:
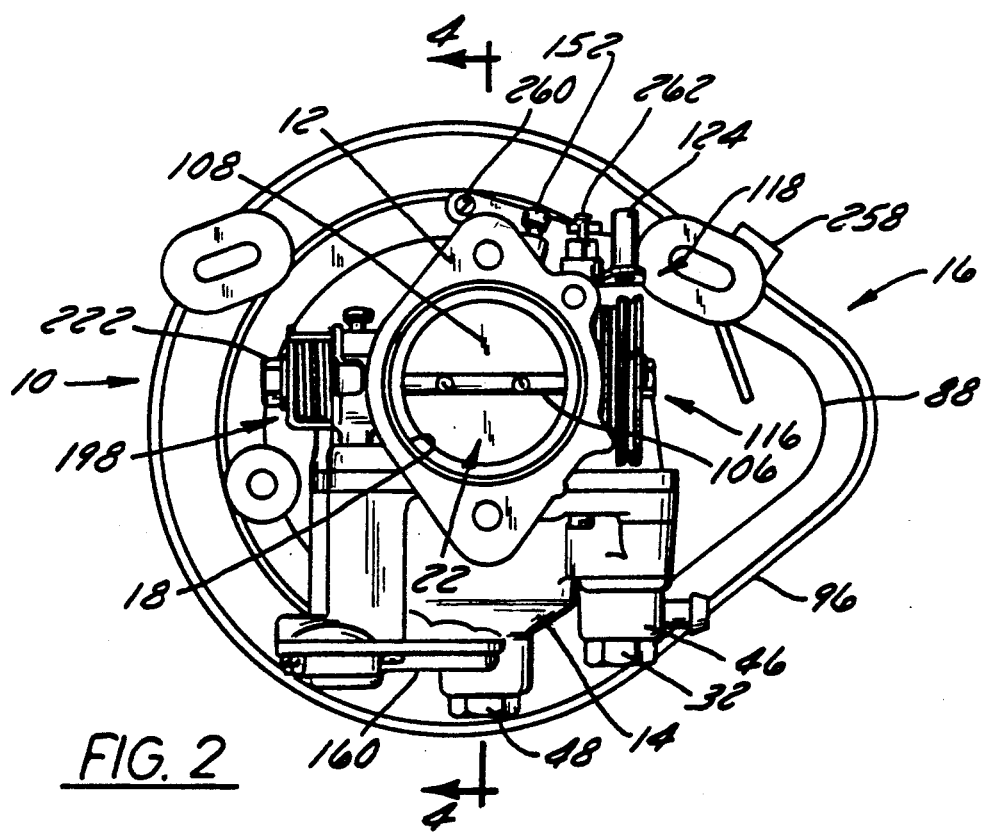
FIG. 2 is a view of the manifold end of the carburetor.

The carburetor 10, FIGS. 1 and 2, according to the present invention generally includes a main body or housing 12 having a fuel bowl 14 secured to the bottom of the housing 12 and an air cleaner assembly 16 mounted on the inlet end of the housing. The main body or housing 12 includes an induction passage 18 having a venturi 20, FIGS. 3 and 4, generally located intermediate the ends of the passage 18. The fuel bowl 14 is connected to the induction passage 18 by a main discharge tube 50 having a high speed fuel jet 68 at the lower end thereof. A butterfly valve assembly 22 is mounted in the manifold end 24 of the induction passage 18 as is generally understood in the art.

Figure 13:
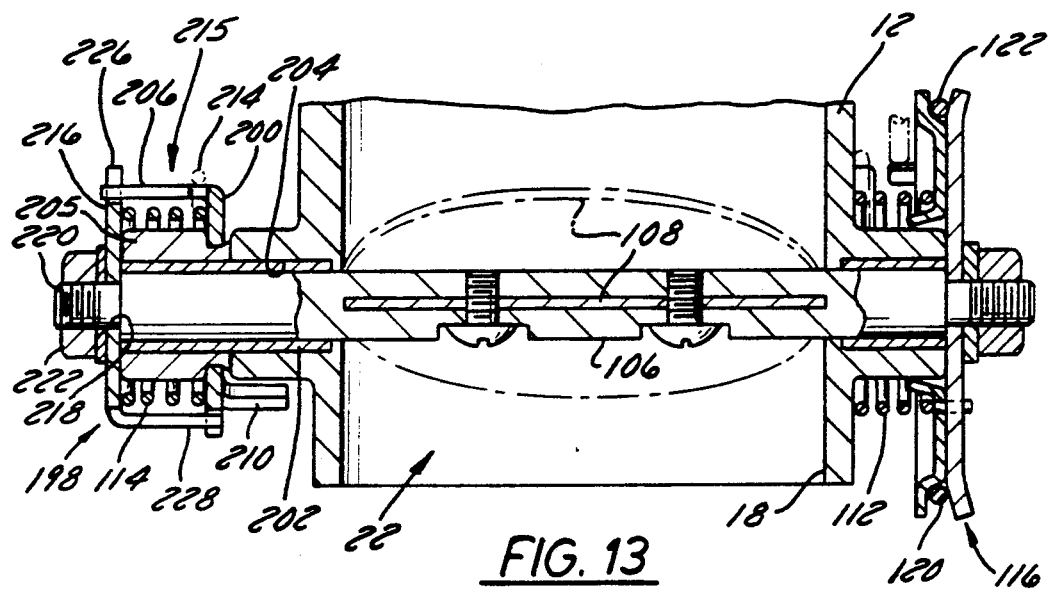
FIG. 13 is a cross section view of the throttle plate shaft assembly.
Figure 12:
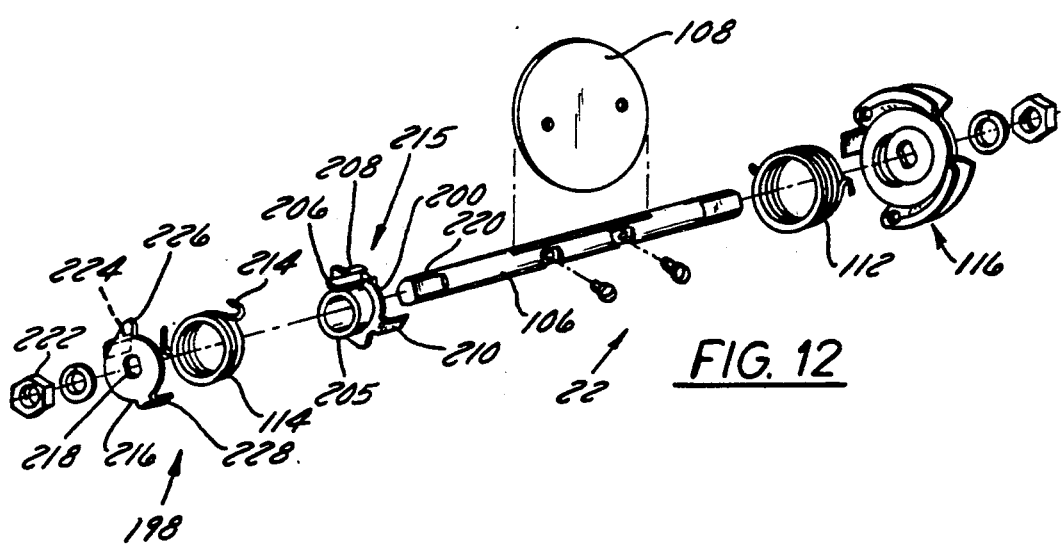
FIG. 12 is an exploded perspective of the throttle plate shaft assembly.

The flow of air through the induction passage 18 is controlled by the butterfly valve assembly 22, FIGS. 12 and 13, which includes a shaft 106 and a throttle plate 108 mounted on a shaft 106. The throttle plate 108 is biased by a spring 112 to a closed position in the passage 18. The throttle plate 108 is angularly positioned, FIG. 4, to close the passage 18. The throttle plate 108 is rotated to an open position by means of a throttle spool assembly 116, FIGS. 1, 5, 12 and 13, which is mounted on the end of the shaft 106. A cable guide bracket 118 is mounted on the housing 12, FIG. 1. Cables 120 and 122, FIG. 13, pass through guides 124, FIG. 1, and are seated in a spool assembly 116 to provide positive opening and closing of the throttle plate 108.

The fuel bowl 14 is mounted on the bottom of the housing 12 and defines a fuel reservoir 26, FIG. 4, below the housing. It should be noted that the fuel bowl 14 is sealed to the housing 12 by a gasket 25, FIG. 7. This gasket 25 also partitions the reservoir 26 from the air chamber 74 in the interior of the housing 12 in such a manner, to minimize the effect of fuel sloshing from the bowl reservoir 26 to the air chamber 74 while still permitting free air movement back and forth.

Figure 7:
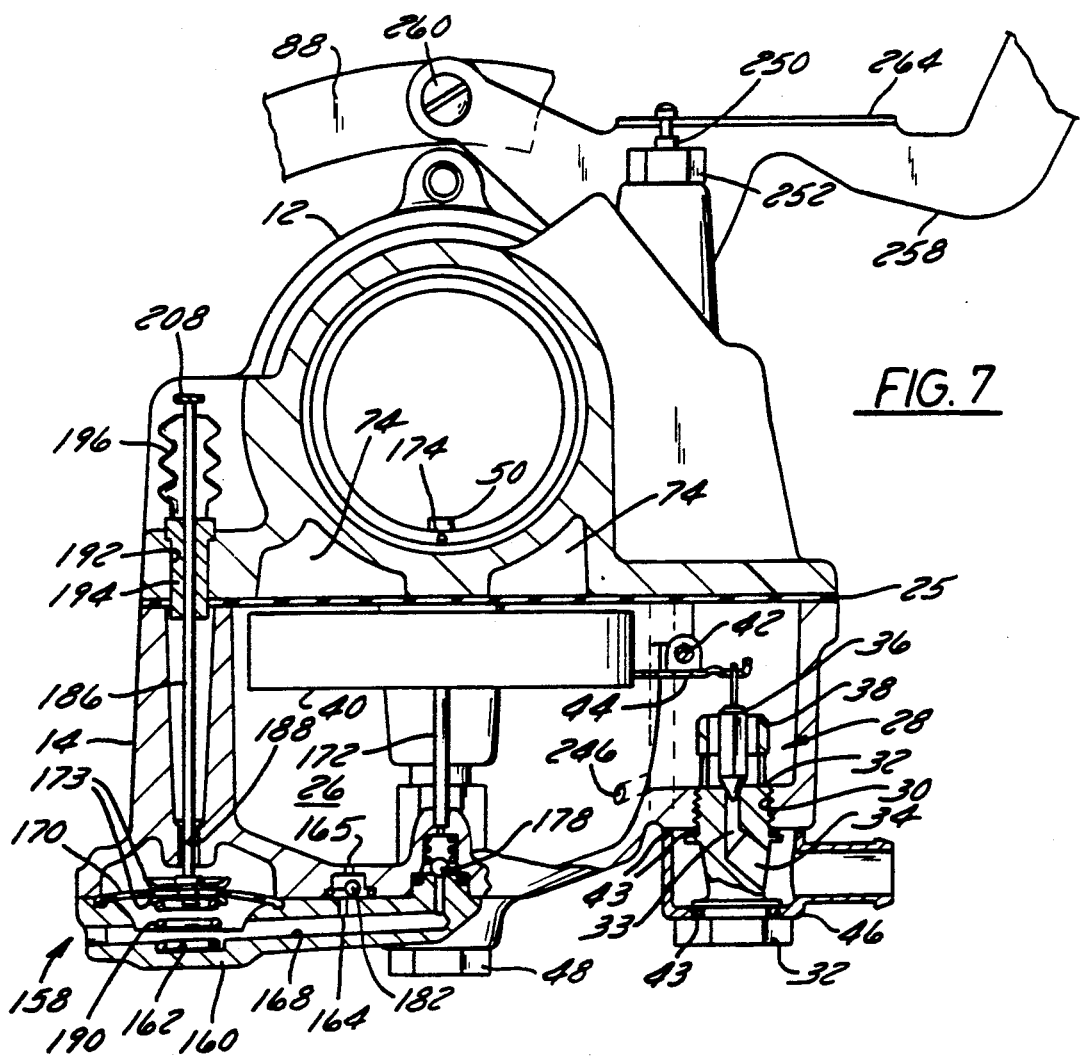
FIG. 7 is a view taken on line 7–7 of FIG. showing a cross section of the accelerator pump assembly and fuel control assembly.

In this regard, the fuel bowl 14 includes a needle and seat assembly 28, FIG. 7, which is mounted in a threaded opening 30 in the bottom of the bowl 14. The assembly 28 includes a valve seat 32 having an inlet port 34. A needle 36 is supported in a holder 38 on the top of the valve seat 32 for axial movement into engagement with a passageway 33 connected to port 34 in the valve seat 32. An annular float 40 is mounted for pivotal movement on a pin 42 and includes an arm 44 which is connected to a needle 36. As is generally understood, the float 40 controls the level of fuel in the fuel reservoir 26, FIGS. 4, 7 and 8, of the bowl 14, to maintain a ready supply of fuel in the carburetor. It should be noted that the pin 42, FIG. 7, lies in a plane generally perpendicular to the direction of motorcycle travel so that the float 40 is not affected by the attitude of the cycle on cornering.

Figure 3:
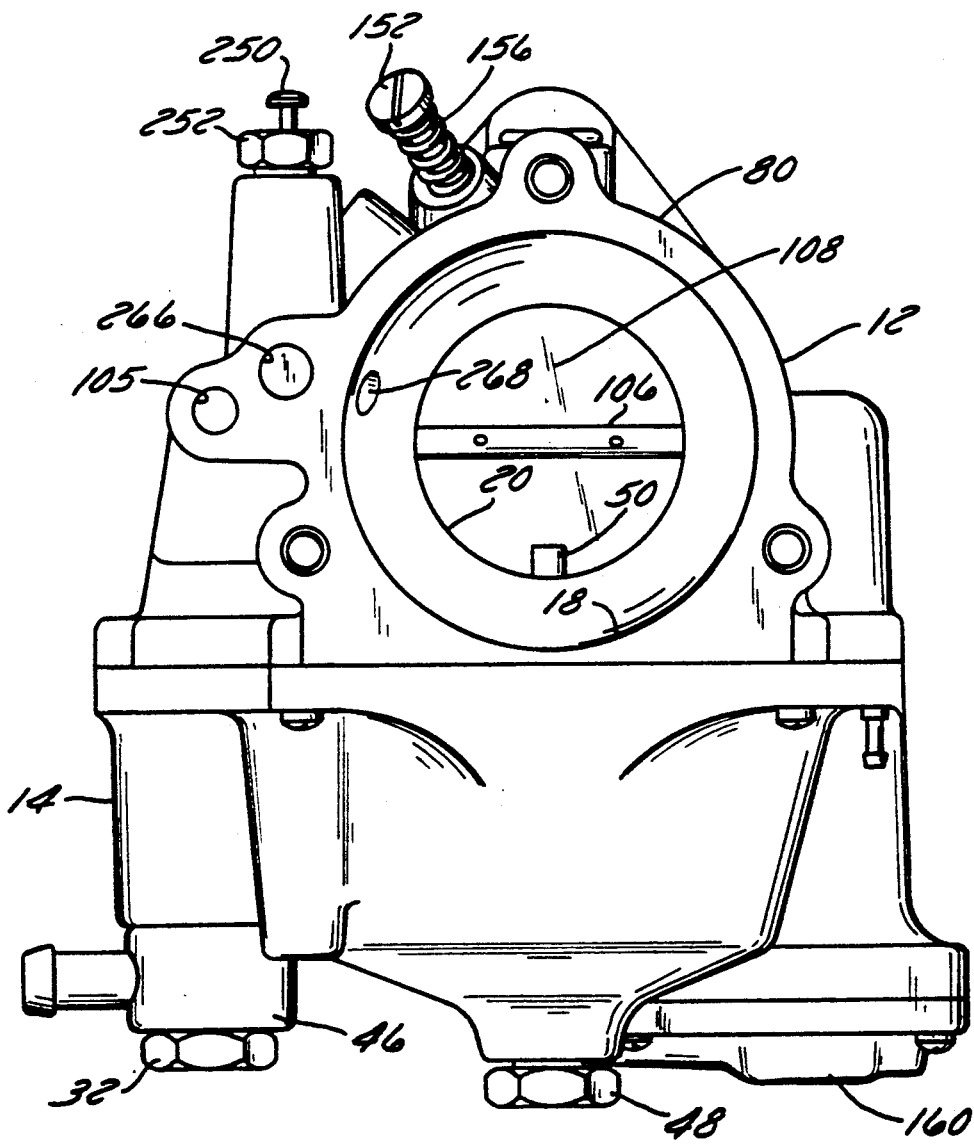
FIG. 3 is a view of the inlet end of the carburetor.

A banjo type fuel inlet fitting 46 is mounted for pivotal movement on the lower end of the valve seat 32 to accommodate a fuel line connection at any angle to the valve seat, FIGS. 3 and 7. An O-ring seal 43 is provided at the top and bottom of the fitting 46 and the bottom of the threaded seat 32 to seal the assembly to the reservoir. A threaded drain plug 48 is provided in the center of the bowl 14.

Teardrop Air Cleaner Assembly

Figure 4:
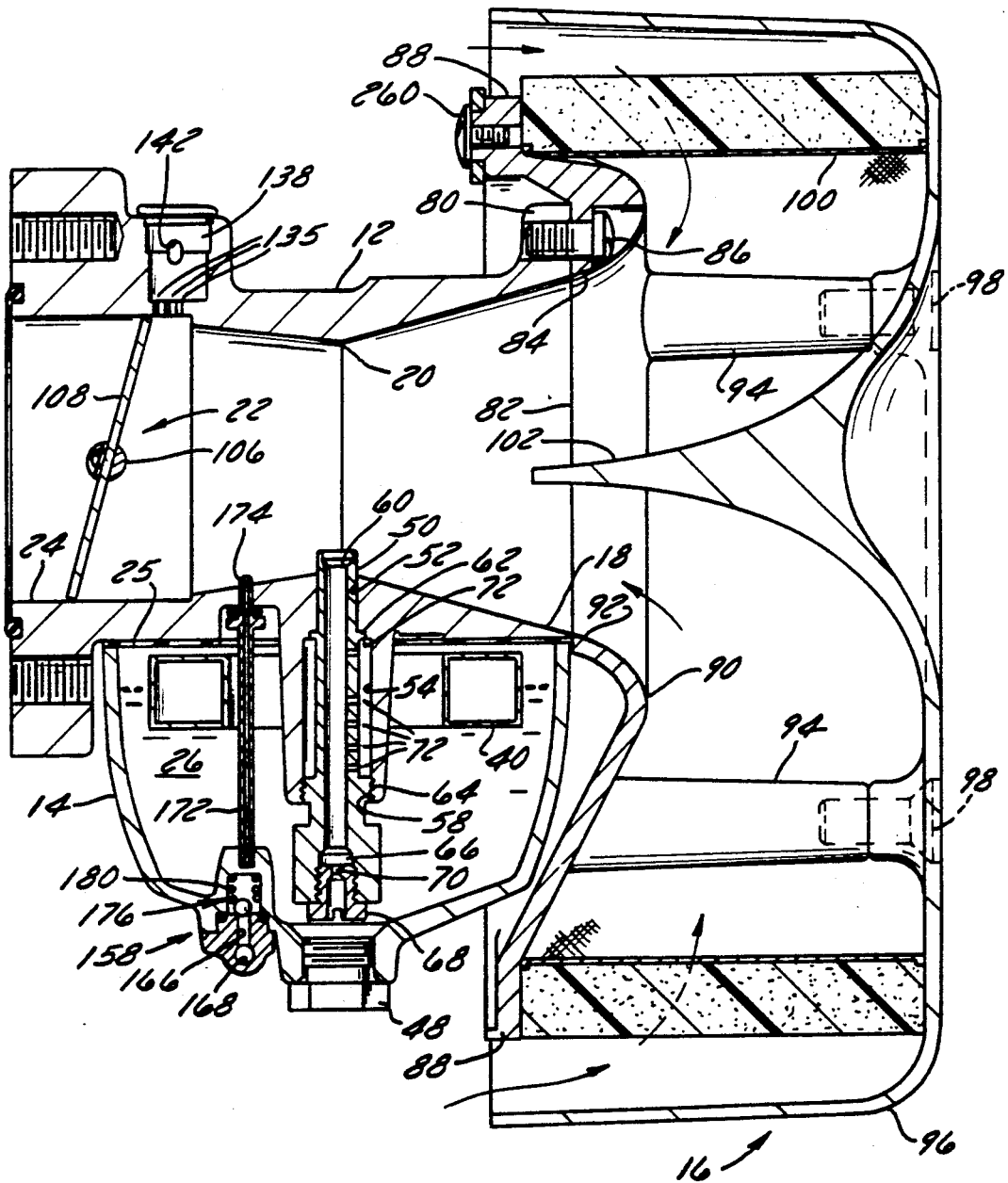
FIG. 4 is a cross section view taken on line 4—4 of FIG. 2.

Air is drawn into the induction passage 18 through the teardrop air cleaner assembly 16 which is mounted on a flange 80 at the end of the housing 12, FIGS. 1, 2 and 4. Teardrop type air cleaners have been used on early carburetors but extended outwardly and upwardly from the end of the carburetors. This interfered with the right leg of the rider and increased the clearance required above the carburetor. The air cleaner assembly 16 as described herein includes a backplate 82 having an inner mounting ring 84 which is connected to the flange 80 by screws 86. A flange 88 is connected to the backplate 82 by means of an arcuate section 90 which forms an air horn style radius entry opening 92 that matingly engages the inlet opening to the induction passage 18. It should be noted that the flange 88 is offset downwardly from the opening 92 as well as inwardly from the backplate 82. Mounting posts 94 are provided on the backplate 82.

A filter element 100 is positioned on the flange 88 and a teardrop shaped cover 96 is mounted on the posts 94 by screws 98. The cover 96 engages the outer edge of the element 100 to retain the element in place. An eccentrically located air directional cone 102 is provided on the inside of the cover 96 and is axially aligned with the axis of the induction passage 18. Moving the cover 96 inwardly with respect to the opening 92 in the backplate 82 and providing the arcuate surface 90 in close proximity to the cone 102 has provided a streamlined air flow passage into the induction passage 18. It should be noted that the backplate 82 has an opening, not shown, that mates with a port 105, FIG. 3, on the inlet end of the housing 12. The port 105 is connected to the interior of the chamber 74 of the housing 12 whereby all air entering the chamber 74 is filtered.

Enrichment Idle System

Figure 8:
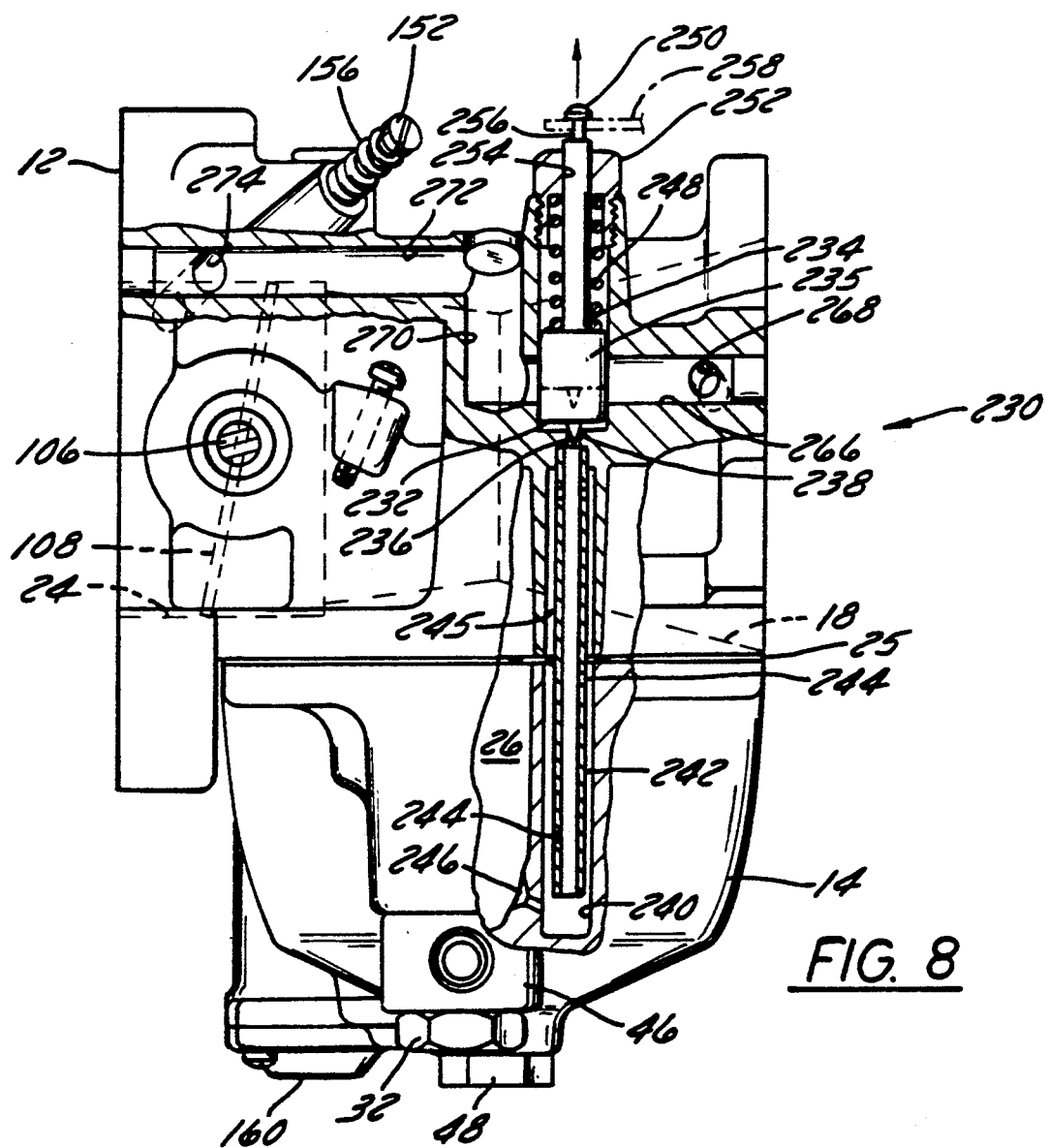
FIG. 8 is a partial cross section view taken on line 8—8 of FIG. 5 showing the variable enrichment/fast idle device.

An enrichment/fast idle system 230, FIG. 8, is provided in a enrichment chamber 232 located on the side of the housing 12 for manual operation during start up and/or fast idling. The assembly 230 includes a plunger 234 which is positioned in the enrichment chamber 232. The plunger 234 includes a head 235 having a needle 236 which engages and closes a primary metering hole 238 at the bottom of the enrichment chamber 232 and a stem 250 on the top of the head 235. The hole 238 is connected to a well 240 in the side of the reservoir 26 in the bowl 14 by a pick up tube 242 having air bleed holes 244 located at intervals along the length of the tube 242. A metering hole 246 is provided at the base of the well 240 to allow fuel from the reservoir 26 to fill the well 240 when the plunger 234 is in a closed position with respect to the primary metering hole 238. Filtered air is drawn into the well 240 through an air metering port 245 located in the chamber 74 in the housing 12. The plunger 234 is biased by a spring 248 into engagement with the metering hole 238.

Figure 11:
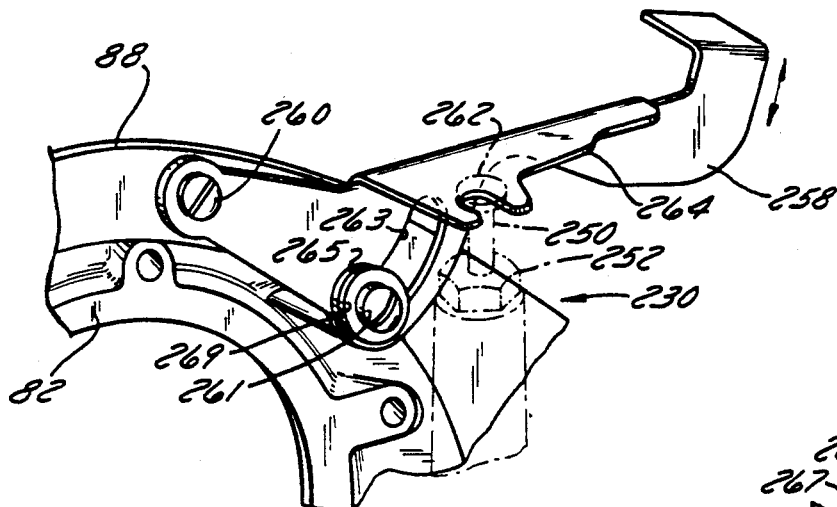
FIG. 11 is a perspective view of the enrichment system actuator lever.

In this regard it should be noted that the spring 248 is positioned on the stem 250 on the plunger 234 between the head 235 of the plunger 234 and a plunger nut 252. The stem 250 projects outwardly through a bore 254 provided in the nut 252. A groove 256 is provided at the end of the stem 250. The position of the plunger 234 in the enrichment chamber 232 is controlled by means of a lever 258 which pivots on a screw 260 provided on the flange 88 of the backplate 82, FIG. 11. The lever 258 is connected to the stem 250 by a slot 262 provided in a flange 264 on the lever 258. The pivotal motion of the lever 258 with respect to the flange 88 is limited by a slot 263 provided in the lever 258 and a screw 261 mounted in flange 88.

Figure 11A:
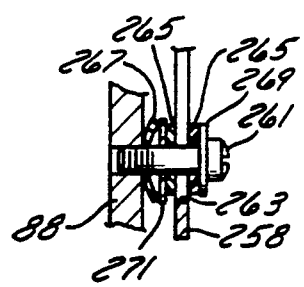
FIG. 11A is a view of the friction control assembly for the actuator lever.

In this regard the lever 258 is frictionally held in position on the flange 88 by a pair of nylon friction discs 265, a bowed spring washer 267 and a pair of pressure plates 269 and 271 mounted on the screw 261, FIG. 11A. The lever 258 can be manually set at any position of travel within the limits of the slot 263.

Figure 5:
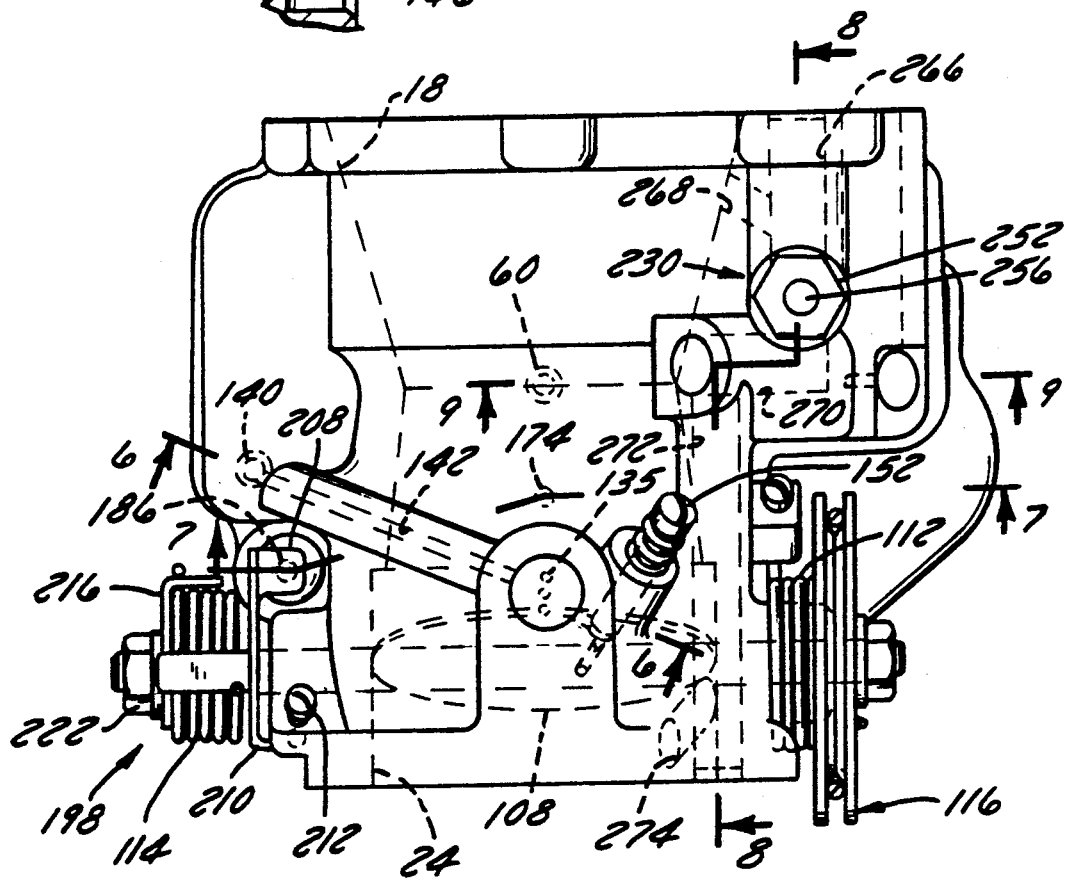
FIG. 5 is a top view of the carburetor.

Air is admitted to the enrichment chamber 232, FIGS. 5 and 8, through an air passage 266 which is connected to the inlet end of the induction passage 18 by an inlet port 268. Air is drawn out of the enrichment chamber 232 through passages 270 and 272. The passage 272 is connected to the outlet of the induction passage 18 by an outlet port 274, located downstream from throttle plate 108. The connection of the passages 266 and 270 to the enrichment chamber 232 is controlled by the position of the head 235 of the plunger 234 in the enrichment chamber 232. As the plunger 234 is pulled upward in the enrichment chamber 232, the needle 236 is pulled out of the hole 238. The head 235 will gradually open the passages 266 and 270, allowing engine vacuum to draw an increasing amount of air through the enrichment chamber 232. This vacuum will also draw an air/fuel mixture through the primary metering hole 238.

Upon initial movement of the plunger 234, the primary metering hole 238 will allow faster discharge of the accumulated fuel in well 240 (mixed with aforementioned air) faster than can be replaced through the fuel metering hole 246. This causes the first second or so of discharge through the outlet passage 274 to be an abnormally rich mixture to aid initial engine start. The following final overall mixture discharging through the outlet passage 274 is a product of the amount of air flow through the passage 266, depending on the plunger head 235 position, air flowing from the air chamber 74 through the air metering port 245 and fuel drawn through the fuel metering hole 246. This mixture will permit adjustable sustained appropriate fast idle speed for various size cold engines without fouling the spark plugs until a suitable engine operating temperature is reached which will sustain unaided conventional idle. The enrichment/fast idle system 230 can then be disengaged manually by moving the lever 258 to the full down position.

Low Speed Air/Fuel Metering And Delivery System

Figure 6:
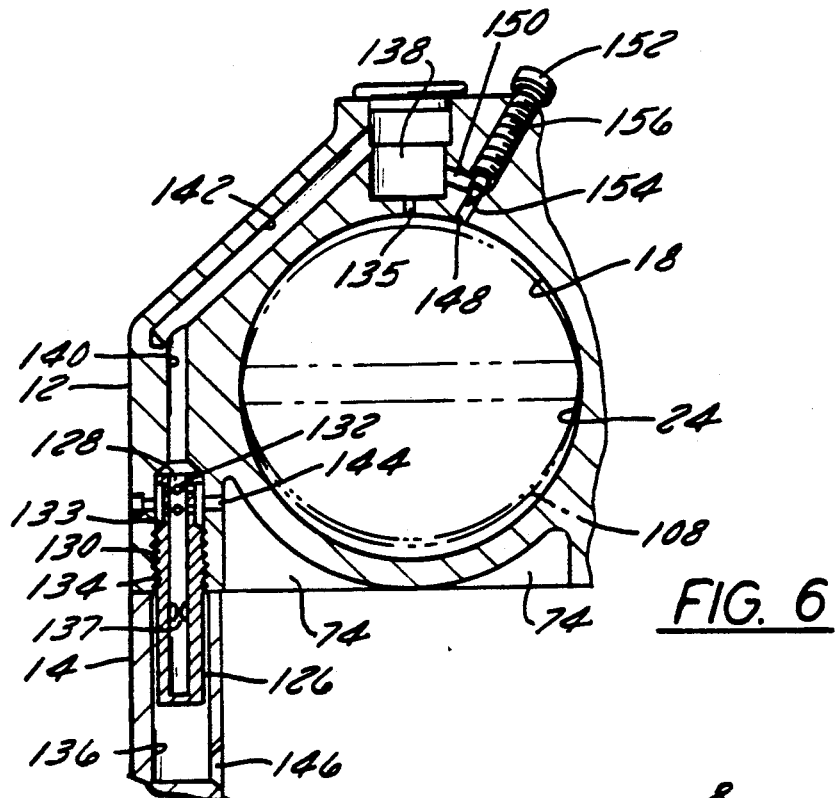
FIG. 6 is a view taken on line 6–6 of FIG. 5 showing the low speed circuit.

A low speed jet 126, as shown in FIG. 6, is provided in a recess 133 in the housing 12 for providing fuel for low speed until transition to a point at which the main/-high speed jet 68, FIG. 4, supplies the engine requirement. The low speed jet 126 includes an axial passage 128 having a metering hole 137 intermediate the ends thereof and a threaded section 130 on the outside thereof. Four holes 132 are provided in the upper end of the jet 126 which connect the passage 128 to the recess 133. The threaded section 130 of the jet 126 is screwed into a threaded section 134 in the end of the recess 133 in the housing 12. The recess 133 is connected to a pattern hole cavity 138 at the top of the housing 12 by air/fuel passages 140 and 142. Three jet outlet holes 135 are provided in a specific pattern in the bottom of the cavity 138 connecting the cavity 138 to the induction passage 18. These holes will subsequently be referred to as pattern holes or holes 135.

Filtered air is admitted into the recess 133 from the top of the air chamber 74 in the housing 12 through a metered opening 144 connected to the recess 133. The low speed jet 126 projects downwardly into a well 136 in the wall of the bowl 14. Fuel is admitted into the well 136 through a hole 146. The low speed jet 126 fuel metering hole 137 may vary in size and distinguishes one changeable low speed jet 126 from another.

An idle mixture supply passage 148 is located on the engine side (manifold end 24) of the throttle plate 108 and is connected to the cavity 138 by a passage 150. Flow of the air/fuel mixture from the cavity 138 is controlled by means of a manually adjustable idle mixture screw 152 having a tapered end 154 which is screwed into a threaded passage 156 in the housing 12. The tapered end 154 is aligned with and protrudes into the inner end of the passage 148 to vary the size of the opening, depending on the position of the screw 152 in the threads 156.

When the engine is started, the engine vacuum causes an air/fuel mixture to be drawn through the passage 148. This air/fuel mixture is a combination of fuel passing through the metering hole 137 in low speed jet 126, premixed in the passage 128 with air passing through the metered opening 144 and then through the holes 132, which is then further mixed with air passing from the induction passage 18 through the pattern holes 135 into the cavity 138. Engine speed and smoothness at idle is controlled by the appropriate combination of a slight opening of the throttle plate 108 and the adjustment of the position of the idle mixture screw 152.

As the carburetor throttle is opened, throttle plate 108, FIG. 4, changes position relative to the pattern holes 135. The direction of flow through the holes 135 then progressively changes from air passing from the induction passage 18 into the cavity 138 to an air/fuel mixture passing from the cavity 138 into the induction passage 18. Continued throttle plate 108 opening movement allows sufficient air to pass through the induction passage 18 to create enough low pressure in the venturi 20 to activate the main (high speed) discharge tube 50. At very slow throttle plate movements, this transition generally occurs when the cycle is traveling about 50-65 mph.

High Speed Air/Fuel Metering And Delivery System

Figure 9:
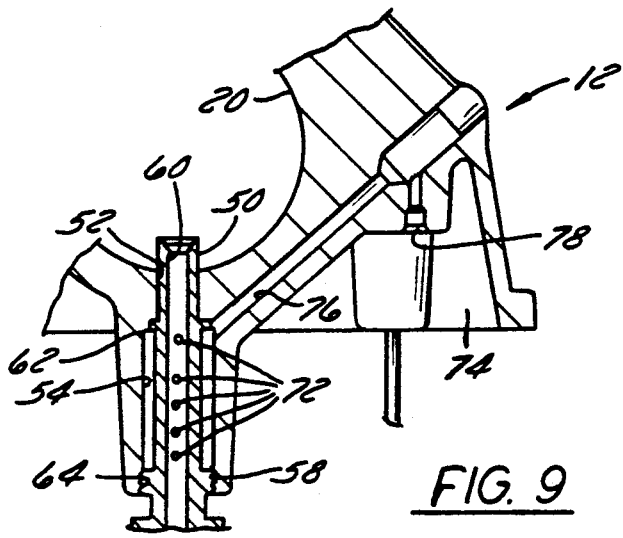
FIG. 9 is a view taken on line 9—9 of FIG. showing a partial cross section view of the main discharge tube air/fuel passages.

The main (high speed) discharge tube 50, FIGS. 4 and 9, is mounted in a vertical passage 52 in the bottom of the housing 12 and projects upwardly into the venturi 20 in the induction passage 18 as shown in FIGS. 3, 4 and 9. The passage 52 includes a counterbore 54 and a threaded section 58 at the lower end of the counterbore 54. The tube 50 includes a center passage 60, a flange 62 at the upper end and a threaded section 64 in the center of the tube 50. A threaded counterbore 66 is provided at the lower end of passage 60. The main (high speed) jet 68 having a metering hole 70 is mounted in the threaded counterbore 66. The metering hole may vary in size and distinguishes one changeable high speed jet 68 from another.

It should be noted that the lower end of the counterbore 54 is located below the fuel level in the reservoir 26. The counterbore 54 is connected to the passage 60 in the tube 50 by means of five holes 72 provided in the tube 50. The counterbore 54 is also connected to the chamber 74 in the lower inner portion of the housing 12 by a passage 76 and an air metering passage 78 provided in the housing 12. When the air velocity through the induction passage 18 causes the venturi 20 to create a sufficient vacuum, fuel in the tube 50 will move upward. This fuel then mixes in the tube 50 with the air passing through the top hole 72 (which is above the bowl fuel level). The filtered air proceeds from the chamber 74 through the metering air passage 78, through the passage 76 and into the counterbore 54, before passing through holes 72. As velocity/vacuum increases, this air/fuel mixture is drawn out of the passage 60 at a greater rate than replaced by air from the metering passage 78 and the fuel metering hole 70. As the passage 60 empties, fuel in the counterbore 54 passes through the remaining holes 72 until the counterbore 54 is empty. At that point, as velocity/vacuum continues to increase, the air/fuel mixture coming out of the passage 60 speeds up, supplied by a continued combination of air from the metering passage 78 and fuel from the metering hole 70 in the main jet 68 which are mixed together in the passage 60.

Accelerator Pump System

Figure 10:
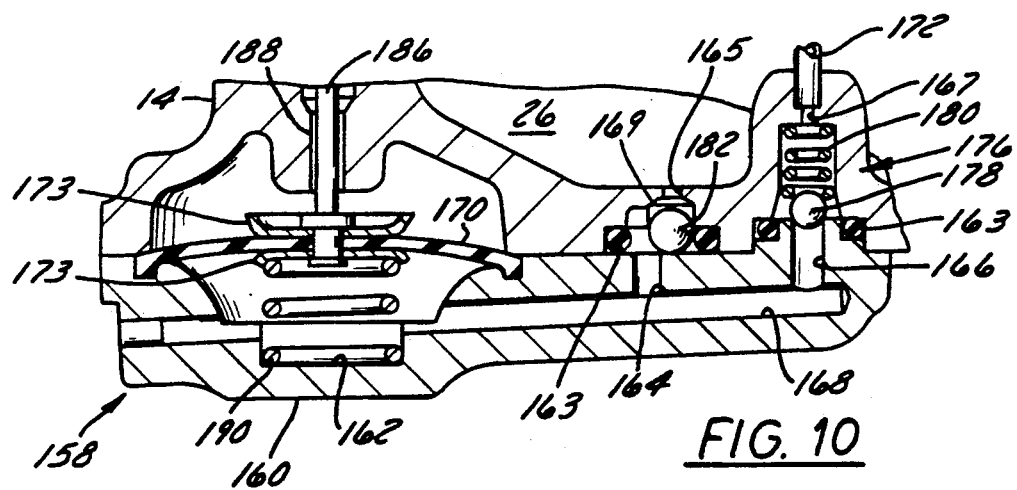
FIG. 10 is an enlarged cross section view of the accelerator pump.

An accelerator pump system 158, as shown in FIGS. 7 and 10, is provided to supplement the fuel mixture in the induction passage 18 during quick throttling (plate 108) movement. The pump system 158 is generally located on the bottom of the bowl 14 and is actuated by the initial rotary motion of the throttle plate shaft 106. The pump system 158 includes a pump cap 160 having a recess 162 at one end which is connected to an inlet passage 164 and an outlet port 166 by a passage 168 in the cap 160. The mating of the cap 160 and the bowl 14 at the inlet passage 164 and the outlet port 166 are sealed by O-ring seals 163. Fuel from the bowl reservoir 26 is free to flow into the inlet passage 164 through an inlet port 165 in the bowl 14. Fuel in the recess 162 is pumped through the passage 168 and the outlet port 166 past a check valve assembly 176, into an outlet passage 167 in the bowl 14 by means of a flexible diaphragm 170 provided over the recess 162. Fuel pumped through the outlet passage 167 is discharged through a tube 172 into the induction passage 18 downstream from the venturi 20. The tube 172 includes a nozzle 174, FIG. 4, which is angled to direct the fuel charge at the centerline of throttle shaft 106.

The direction of fuel flow through the outlet port 166 is controlled by a check valve assembly 176, FIG. 10, which is located in the bottom of the bowl 14. The check valve assembly 176 is comprised of a ball 178 biased by a spring 180 into engagement with the outlet port 166. When the fuel in the passage 168 is pressurized, the ball 178 is lifted, allowing fuel to pass through the outlet port 166, the outlet passage 167, through the tube 172 and out through the nozzle 174. When the pump 158 is not actuated or is being refilled (recharged), the ball check valve assembly 176 prohibits air from entering the system through the nozzle 174 and simultaneously keeps the tube 172 and the nozzle 174 full of fuel to provide a ready supply for responsive discharge upon the next actuation. It should be noted that the ball 178 is biased into engagement with the outlet port 166 by the spring 180 with sufficient force to prohibit vacuum in the induction passage 18 from drawing fuel through the outlet port 166 while the pump system 158 is not actuated.

The direction of flow of fuel through the inlet port 165 is controlled by means of a ball 182 which is located in a recess 169 in the bowl 14 above the surface of the cap 160. The inlet passage 164 is located off center from the recess 169 in such a manner so that the ball 182 will not block the passage 164 thus allowing fuel flow between the recess 169 and the passage 164. When the fuel in the passage 168 is pressurized, the force of the fuel passing through the inlet passage 164 will force the ball 182 into engagement with the inlet port 165 in the bowl 14 preventing the flow of fuel into the reservoir 26.

The fuel in the passage 168 is pressurized to force a charge of fuel up through the tube 172 by means of a push rod 186 mounted in a hole 188 in the bowl 14 in alignment with the diaphragm 170. A pair of discs 173 are mounted in the center of the diaphragm 170 to protect the diaphragm 170 from the rod 186. The circumference of the diaphragm 170 is sealed between the cap 160 and the bowl 14. The diaphragm 170 is biased by a spring 190 into engagement with the lower end of the rod 186. The rod 186 is centered in a hole 192, FIG. 7, in the housing 12 by a bushing 194. The top of the bushing 194 is sealed by a resilient bellows 196 which is mounted on the bushing 194 at one end and to the upper end of the push rod 186 at the other end. The push rod 186 is pushed downward against the diaphragm 170 to discharge a squirt of fuel into the induction passage 18.

In this regard, an actuating assembly 198, FIGS. 5, 12 and 13, is mounted on the end of the shaft 106 in a position to engage the push rod 186, FIGS. 5 and 7, each time the shaft 106 is actuated. The assembly 198, FIGS. 5, 7, 12 and 13, includes a lever plate 200 mounted on the end of a bushing 205 forming a lever actuator 215 which rotates on the protruding outside diameter of a throttle shaft bushing 202 which is pressed into an opening 204 in the side of the housing 12. The lever plate 200 includes a spring tab 206, an actuating tab 208, FIG. 12, and a motion limiting tab 210. The actuating tab 208 is positioned to engage the end of the push rod 186, FIGS. 5 and 7. The motion limiting tab 210 is positioned to engage a limiting screw 212 mounted on the housing 12, FIG. 5. The limiting screw 212 can be adjusted to control the amount of fuel discharged into the induction passage 18. The spring 114 surrounds the exterior diameter of the bushing 205. One end 214 of the spring 114 is attached to the spring tab 206 on a lever actuator 215, FIGS. 12 and 13.

An actuator plate 216 having a uniquely shaped opening 218 is mounted on a similarly shaped end 220 of the shaft 106 and secured thereto by a nut 222. The plate 216 includes a spring tab 224, a return tab 226 and a guide tab 228. The remaining end of the spring 114 is connected to the tab 224. The spring tab 206 on the lever plate 200 is located in the path of motion of the return tab 226 on the actuator plate 216. On rotary motion of the shaft 106 to open the plate 108, the spring tab 224 on the actuator plate 216 will rotate the spring 114 which is connected to the tab 206 on the lever plate 200. The lever plate 200 will rotate with the spring 114 moving the tab 208 and thus also moving the push rod 186, FIGS. 5, 7, 12 and 13. The motion of the lever actuator 215 which in turn controls the push rod 186 is limited by the movement of the tab 210 into engagement with the screw 212, FIG. 5. On the return motion of the shaft 106, the return tab 226 will engage the spring tab 206 to return the lever actuator 215 to the start position.

With this arrangement the accelerator pump 158 will be actuated each time the throttle plate 108 is opened quickly enough and there is sufficient travel remaining between the limiting tab 210 and the limiting screw 212 to create enough pressure to move the ball check 182 to block the inlet port 165, FIG. 10, thus squirting fuel out of the nozzle 174 into induction passage 18, FIGS. 4 and 7.

Conversely, when the throttle plate 108 is closed sufficiently to produce travel between the limiting tab 210 and the limiting screw 212, the ball 182 drops and unblocks the inlet port 165, allowing fuel replenishment to the recess 162 below the diaphragm 170, thus recharging the system pump 158.

Thus, it should be apparent that there has been provided in accordance with the present invention an improved carburetor that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A butterfly type motorcycle carburetor comprising:
   a housing having an induction passage, a venturi intermediate the ends of said passage, and an air chamber in the bottom of said housing,
   a butterfly valve assembly positioned in said induction passage downstream from said venturi,
   a fuel bowl mounted on said housing and forming a fuel reservoir below said induction passage,
   a main discharge tube mounted in said housing and having one end extending into said venturi in said induction passage, the other end of said discharge tube extending into said reservoir, and
   an accelerator pump system mounted on the bottom of said fuel bowl, said system including a discharge nozzle extending into said induction passage downstream from said venturi for directing fuel discharged from said nozzle toward said butterfly valve.

2. The carburetor according to claim 1 including an adjusting screw mounted on said housing for limiting the motion of said pump to thereby adjust the amount of fuel discharged from said pump.

3. The carburetor according to claim 2 wherein said pump system includes a cap mounted on said fuel bowl, said cap including a recess at one end, an inlet port connected to said reservoir and an outlet port connected to said discharge nozzle, a passage in said cap connecting said recess to said inlet port and to said outlet port, a diaphragm sealing said recess and a push rod mounted in said housing for pulsing said diaphragm to force fuel through said outlet port.

4. The carburetor according to claim 3 including a check valve in said inlet port and said outlet port for preventing flow from said passage through said inlet port and return flow from said discharge tube through said outlet port to said passage.

5. The carburetor according to claim 1 including an air cleaner for filtering air prior to admission to said induction passage, said cleaner comprising a teardrop shaped cover, an air directional cone eccentrically mounted in said cover and a backplate mounted on said housing for supporting said cover on the inlet end of said induction passage with said cone axially aligned with said induction passage.

6. The carburetor according to claim 5 wherein said backplate includes an arcuate entry section for streamlining the air entry path into said induction passage.

7. The carburetor according to claim 5 including means for connecting said air chamber to said air cleaner whereby air entering said air chamber is filtered by said air cleaner.

8. The carburetor according to claim 1 including an enrichment system in said housing, said enrichment system including an air flow passage in said housing having one end connected to said induction passage upstream from said venturi and the other end connected to the induction passage downstream from said butterfly valve,
   a enrichment chamber in said air flow passage intermediate the ends thereof,
   means for connecting said enrichment chamber to said fuel reservoir and said air chamber,
   means in said enrichment chamber for closing said air flow passage and said connecting means, and
   means for selectively moving said closing means to open said connecting means and said air passage whereby air drawn through said enrichment chamber will draw an air/fuel mixture from said reservoir and said air chamber into said enrichment chamber for discharge into said induction passage downstream from said butterfly valve assembly.

9. The carburetor according to claim 8 including a gasket between said housing and said fuel bowl to separate said air chamber from said fuel reservoir.

10. The carburetor according to claim 9 including a pattern hole cavity in said housing having a number of low speed jet outlets connected to said induction passage in close proximity to said butterfly valve assembly, a passage in said housing connecting said cavity to said air chamber, and a low speed jet connecting said air/fuel passage to said fuel reservoir.

11. The carburetor according to claim 10 including an idle mixture assembly in said housing, said idle mixture assembly including an idle mixture passage connecting said pattern hole cavity to said induction passage downstream from said butterfly valve assembly and an adjustment screw for selectively metering an air/fuel mixture through said idle mixture passage to said induction passage.

12. A motorcycle carburetor comprising a housing having an induction passage, a venturi intermediate the ends of said passage and an air chamber in the bottom of said housing, a butterfly valve positioned in said induction passage downstream from said venturi, a fuel bowl mounted on said housing and forming a fuel reservoir below said air chamber, a main discharge tube mounted in said housing and having one end extending into said venturi in said induction passage, the other end of said discharge tube extending into said reservoir and being operatively connected to said air chamber, an enrichment system in said housing, said enrichment system including an air flow passage in said housing having one end connected to said induction passage upstream from said venturi and the other end connected to said induction passage downstream from said butterfly valve, an enrichment chamber in said air flow passage intermediate the ends thereof, means for connecting said enrichment chamber to said air chamber and said fuel reservoir, and a plunger in said enrichment chamber for selectively opening and closing said air flow passage whereby air passing through said enrichment chamber will draw air/fuel from said air chamber and reservoir for discharge into said air passing through said enrichment chamber.

13. A motorcycle carburetor comprising:

a housing having an induction passage, a venturi intermediate the ends of said passage and an air chamber in the bottom of said housing, a butterfly valve assembly positioned in said induction passage downstream from said venturi to control the flow of air through said induction passage.

a bowl mounted on said housing and forming a fuel reservoir below said air chamber in said housing, a main discharge tube mounted in said housing and having one end extending into said venturi in said induction passage and the other end extending into said reservoir.

means in said bowl for controlling the level of fuel in said bowl, and an enrichment system in said housing, said enrichment system comprising an air flow passage in said housing having one end connected to said induction passage upstream from said venturi and the other end connected to said induction passage downstream from said butterfly valve assembly, a chamber in said air flow passage intermediate the ends thereof, means for connecting said chamber to said air chamber and said fuel reservoir, and a plunger in said chamber for selectively opening and closing said air flow passage and means connected to said plunger for maintaining said plunger in a preselected position in said chamber whereby the amount of air passing through said chamber can be set to draw a predetermined amount of air and fuel from said chamber and reservoir for discharge into said induction passage.

14. The carburetor according to claim 13 including an accelerator pump system mounted on the bottom of said fuel bowl, said system including a discharge nozzle extending into said induction passage downstream from said venturi, said nozzle including means for directing fuel discharged from said nozzle toward said butterfly valve and means connected to said butterfly valve assembly for actuating said pump system on the initial motion of said butterfly valve assembly.

15. The carburetor according to claim 14 including a pattern hole cavity in said housing located above said butterfly valve assembly and an air chamber below said induction passage, a passage in said housing connecting said air chamber to said cavity, a fuel jet connecting said passage to said fuel reservoir, and a number of ports connecting said chamber to said induction passage whereby air passing through said induction passage will draw an air/fuel mixture from said reservoir through said chamber into said induction passage.

16. The carburetor according to claim 15 including an idle mixture assembly in said housing, said assembly including an idle mixture passage connecting said cavity to said induction passage downstream from said butterfly valve assembly and an adjustment screw for selectively metering an air/fuel mixture flow through said idle mixture passage to said induction passage.

17. A butterfly type motorcycle carburetor comprising a housing having an induction passage and a venturi intermediate the ends of said passage, a butterfly valve assembly positioned in said induction passage downstream from said venturi, a fuel bowl mounted on housing and forming a fuel reservoir and an air chamber below said induction passage, a main discharge tube mounted in said housing and having one end extending into said venturi in said induction passage, the other end of said discharge tube extending into said air chamber and reservoir, an accelerator pump system mounted on the bottom of said fuel bowl, said system including a discharge nozzle extending into said induction passage downstream from said venturi, said nozzle including means for directing fuel discharged from said nozzle toward said butterfly valve, an enrichment system in said housing including an air flow passage in said housing having one end connected to said induction passage upstream from said venturi and the other end connected to the induction passage downstream from said butterfly valve, a chamber in said air flow passage intermediate the ends thereof, means for connecting said chamber to said air chamber and fuel reservoir, means in said chamber for closing said air flow passage and said connecting means, and means for selectively moving said closing means to open said connecting means and said air passage whereby air drawn through said chamber will draw an air fuel mixture from said air chamber and fuel reservoir, an air cleaner for filtering the air prior to admission to said induction passage, said cleaner including a teardrop shaped cover, an air directional cone eccentrically mounted in said cover and a backplate mounted on said housing for supporting said cover on the inlet end of said induction passage with said cone axially aligned with said induction passage.

18. The carburetor according to claim 17 including a pattern hole cavity in said housing having a number of low speed jet outlets connected to said induction passage, an air fuel passage in said housing connecting said cavity to said air chamber and an intermediate jet connecting said air fuel passage to said fuel reservoir and an idle mixture assembly in said housing, said idle mixture assembly including an idle mixture passage connecting said pattern hole cavity to said induction passage downstream from said butterfly assembly and an adjustment screw for selectively metering an air fuel mixture through said idle mixture passage to said induction passage and means for connecting said air chamber to said air cleaner whereby air entering said air chamber is filtered by said air cleaner.

* * * * *